US012663376B2

(12) United States Patent
Dahotre et al.

(10) Patent No.: US 12,663,376 B2
(45) Date of Patent: Jun. 23, 2026

(54) LASER ENERGY ASSISTED BREAKDOWN SPECTROSCOPY (LEABS) COUPLED PHYSICS INFORMED RAPID, IN-SITU, AND IN-TIME COMPOSITIONAL MONITORING DURING HIGH ENERGY DENSITY INPUT THREE-DIMENSIONAL ADDITIVE MANUFACTURING

(71) Applicant: University of North Texas, Denton, TX (US)

(72) Inventors: Narendra B. Dahotre, Denton, TX (US); Andrey Voevodin, Denton, TX (US); Brian Squires, Denton, TX (US)

(73) Assignee: UNIVERSITY OF NORTH TEXAS, Denton, TX (US)

( * ) Notice: Subject to any disclaimer, the term of this patent is extended or adjusted under 35 U.S.C. 154(b) by 162 days.

(21) Appl. No.: 18/774,264

(22) Filed: Jul. 16, 2024

(65) Prior Publication Data

US 2025/0035556 A1     Jan. 30, 2025

Related U.S. Application Data

(60) Provisional application No. 63/528,467, filed on Jul. 24, 2023.

(51) Int. Cl.
*G01N 21/71* (2006.01)
*B22F 10/85* (2021.01)
*B33Y 50/02* (2015.01)

(52) U.S. Cl.
CPC ........... *G01N 21/718* (2013.01); *B22F 10/85* (2021.01); *B33Y 50/02* (2014.12); *G01N 2201/06113* (2013.01)

(58) Field of Classification Search
CPC ........ G01N 21/718; G01N 2201/06113; B22F 10/85; B22F 10/25; B22F 10/28; B22F 10/38; B22F 10/50; B22F 12/43; B22F 12/90; B33Y 50/02; B33Y 30/00; B33Y 10/00
See application file for complete search history.

(56) References Cited

U.S. PATENT DOCUMENTS

| | | | | |
|---|---|---|---|---|
| 10,222,337 | B1 * | 3/2019 | Yoo | H01J 49/105 |
| 11,300,451 | B2 * | 4/2022 | Matousek | G01J 3/44 |
| 11,478,992 | B2 * | 10/2022 | Crane | B29C 64/40 |
| 2004/0233944 | A1 * | 11/2004 | Dantus | G01B 9/02014 |
| | | | | 372/25 |
| 2020/0124530 | A1 * | 4/2020 | Stolow | G01N 21/636 |
| 2020/0333295 | A1 * | 10/2020 | Schiffres | G06N 20/00 |
| 2021/0187615 | A1 * | 6/2021 | Dreano | B33Y 50/00 |
| 2022/0009124 | A1 * | 1/2022 | Xiao | B28B 1/001 |
| 2023/0033494 | A1 * | 2/2023 | Eliaz | B33Y 70/00 |

* cited by examiner

*Primary Examiner* — Sang H Nguyen
(74) *Attorney, Agent, or Firm* — Jackson Walker LLP

(57) ABSTRACT

Chemical composition of a component fabricated using high energy density input based three-dimensional additive manufacturing is in-situ monitored in real time. Laser Energy Assisted Breakdown Spectroscopy (LEABS) is coupled with a rapid physics-informed peak identification algorithm (RPIPIA) to monitor the atomic composition of component material (metallic, intermetallic, ceramic and metallic or ceramic matrix composites) in pseudo-real time during its fabrication using high energy density (laser, ion beam, gas plasma, electric resistance/discharge, gas torch) input (HEDI) based additive manufacturing.

19 Claims, 5 Drawing Sheets

FIG. 1
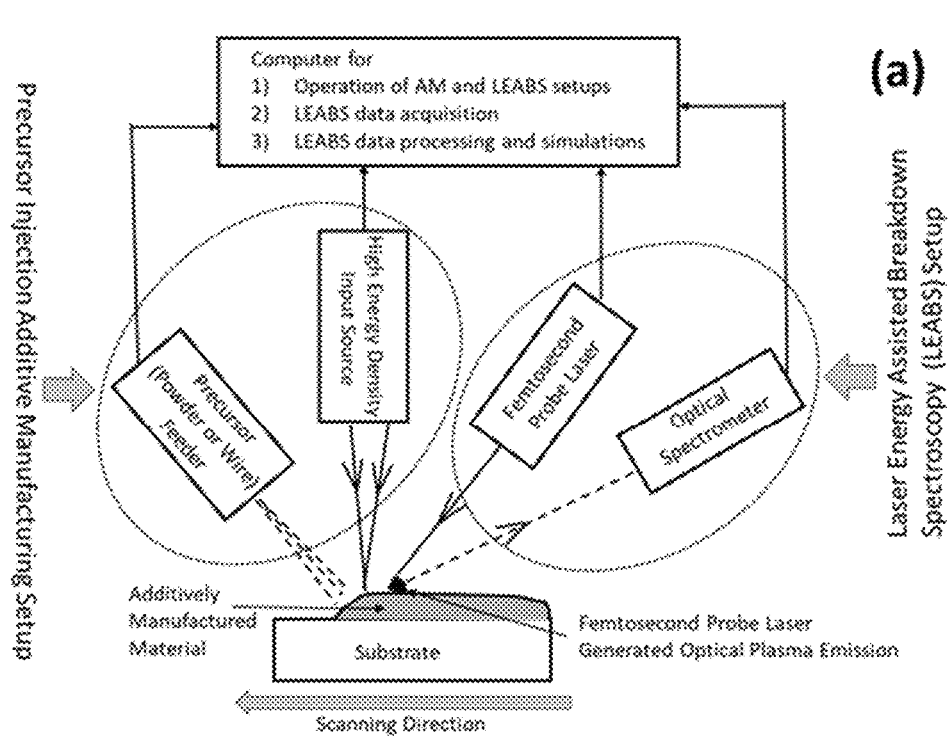
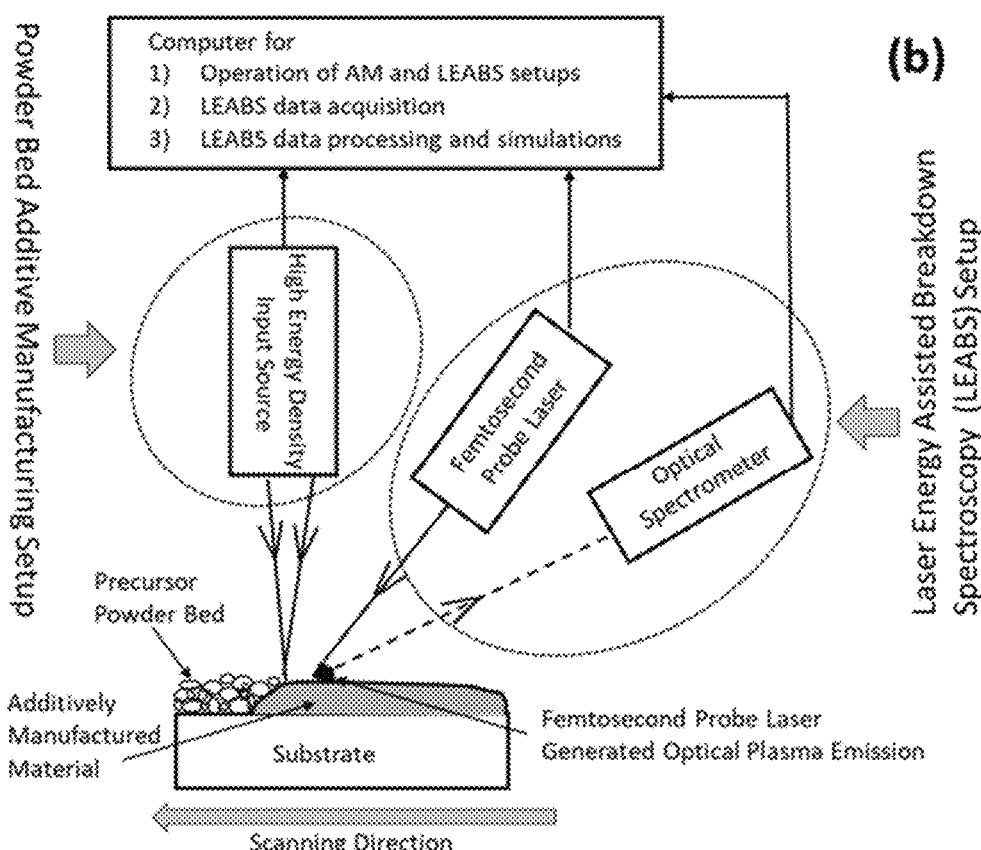

FIG. 2

Generate high energy density (laser, ion beam, gas plasma, electric resistance, electric discharge, gas torch) input (HEDI) for additive manufacturing (AM) of a component (1)

Program a computer operating AM machine with the structural and material specifications as well as HEI related parameters based on a database reference and suitable for the components to be manufactured. (2)

Traverse a laser energy assisted beam spectroscopy (LEABS) probe of 1040 nm fiber amplified femtosecond (fs) laser just behind the HEI source on the surface of the component that is being additively manufactured. (3)

A LEABS probe laser beam is operated in predetermined pulse energy (μJ) and frequency (kHz) and further pulse picked with an integrated acousto-optic modulator to generate a fixed pulse train (kHz – fs) (4)

A LEABs probe laser beam is focused using a plano-covex lens onto the surface of the component being AM processed. (5)

A plasma emission generated by the interaction of LEABS probe laser beam with the component being AM manufactured is collected with an ultraviolet (UV) enhanced achromatic doublet and focused into a multimode fiber with an all-reflective fiber collimator. (6)

The plasma emission is dispersed by a grating spectrometer and detected with an intensified detector. (7)

The detector is synchronized with the optical pulse train and gated to measure the emission at a fixed duration (ns) after the ablation event with a suitable gate width (μs). (8)

Atomic emission spectra of the expected elemental species were simulated by calculating the expected emissivity of each transition using database of physical constants compiled by the NIST ASD database and a computational algorithm developed to simulate the expected optical emission spectra from a laser induced plasma at a given plasma temperature and atomic composition. (9)

The acquisition and subsequent data analysis are automated in Python using the Xarray package for multidimensional data management. (10)

Repeat above steps (3)-(10) for all desired locations during AM fabrication of a component (11)

Use LEABS coupled with in-situ rapid physics-informed peak identification algorithm (RPIPIA) to monitor the atomic composition of a component material (metallic, intermetallic, ceramic and metallic or ceramic matrix composites) in real time during its fabrication using high energy density (laser, ion beam, gas plasma, electric resistance, electric discharge, gas torch) input (HEDI) based AM with close-loop control and monitoring. (12)

LASER ENERGY ASSISTED BREAKDOWN SPECTROSCOPY (LEABS) COUPLED PHYSICS INFORMED RAPID, IN-SITU, AND IN-TIME COMPOSITIONAL MONITORING DURING HIGH ENERGY DENSITY INPUT THREE-DIMENSIONAL ADDITIVE MANUFACTURING

This application claims priority to U.S. Provisional Patent Application Ser. No. 63/528,467, filed Jul. 24, 2023, entitled "Laser Energy Assisted Breakdown Spectroscopy (LEABS) Coupled Physics Informed Rapid, In-Situ, and In-Time Compositional Monitoring During High Energy Density Input Three-Dimensional Additive Manufacturing," the entire contents of which are incorporated by reference herein.

This invention was made with government support under Army Research Laboratory Cooperative Agreement Award No. W911NF-19-2-0011. The Government has certain rights in the invention.

BACKGROUND

This disclosure pertains to methods and systems for compositional monitoring during three-dimensional additive manufacturing.

Modern day Additive Manufacturing (AM) equipment companies are offering a suite of instrumentation to collect information both in-situ and ex-situ on the melt pool size and temperature, as well as the resulting porosity, lack of fusion, balling and other defects in the built parts. Although most of these studies focused on in-situ diagnosis of AM, other than very few, all these studies were dedicated to use of in-situ diagnosis approach for identifying and monitoring evolution of physical anomalies such as porosity, cracking, surface roughness as well as measurement of temperature and correlation of these aspects with mechanical properties of the component being AM fabricated. These methods for in-situ monitoring of AM processes typically include optical image processing for 3D reconstruction, as well as IR cameras or pyrometers to detect temperatures of both the part and the melt pool. However, very few references in the open literature indicated adaptation of the basic principle of characteristic optical emission for in-situ characterization and feedback control based on (chemical) composition of the component being built. Some of these references only explained the basic principle of optical emission spectroscopy and its potential for in-situ diagnosis while remaining other references have demonstrated its utility for real time monitoring of composition during AM based component fabrication.

The utility of such spectroscopic techniques for quantitative composition monitoring in a highly reliable, repeatable and accurate manner is significantly limited by a highly stochastic continuum background from the plasma produced by the AM processing laser due to the laser-matter interaction. As the plasma cools, the light emission mechanisms progress from free electron-ion recombination to well defined excited-state atomic transitions. The plasma dynamics and subsequent emission of light, depend strongly on the energy and temporal duration of the laser-matter interaction. In the continuous-wave (CW) and quasi-CW regime, typically used in metal AM processing, the light emission consists of a bright broadband background from free electron-ion recombination and inverse bremsstrahlung (thermal) radiation that obscure the characteristic atomic emission lines. Due to total lack of consideration of these physical aspects in the existing references, the applicability of in real-time/in-situ optical spectroscopy diagnosis during AM based component fabrication is severely hindered in terms of reliability, repeatability, and accuracy. In light of these limitations, it would be desirable to have a method and an instrumentation to address some or all of the aspects stated above along with any other possible/potential issues.

SUMMARY

The present disclosure relates generally to methods and systems for compositional monitoring during three-dimensional additive manufacturing.

In particular, the present disclosure relates to in-situ and real time (in-time) monitoring of the chemical composition of a component fabricated using high energy density input based three-dimensional additive manufacturing.

In preferred embodiments of the methods and systems described herein, a secondary laser energy assisted beam spectroscopy (LEABS) probe of infrared (IR) (1040 nm) fiber amplified femtosecond (fs) laser traverses behind the primary high energy density input source that is being employed to additively manufacture (AM) a component. A LEABS probe laser beam is operated in predetermined combination of pulse energy (μJ) and frequency (kHz) and further pulse picked with an integrated acousto-optic modulator to generate a fixed pulse train (kHz-fs). A LEABS probe laser beam is focused using a plano-convex lens onto the surface of the component being AM processed to generate a strong plasma emission which is collected with an ultraviolet (UV) enhanced achromatic doublet and focused into a multimode fiber with an all-reflective fiber collimator. The plasma emission is dispersed by a grating spectrometer and detected with an intensified detector. The detector is synchronized with the optical pulse train and gated to measure the emission at a fixed duration (ns) after the ablation event with a suitable gate width (μs). Atomic emission spectra of the expected elemental species are simulated by calculating the expected emissivity of each transition using database of physical constants compiled by the National Institute of Standard and Technology (NIST) open source Atomic Spectra Database (ASD) and a computational algorithm developed to simulate the expected optical emission spectra from a laser induced plasma at a given plasma temperature and atomic composition. The acquisition and subsequent data analysis are automated in Python using the Xarray package for multidimensional data management. The above steps are repeated for all desired locations during AM fabrication of a component. The apparatus and methods are employed in close-loop control and monitoring with three-dimensional additive manufacturing.

BRIEF DESCRIPTION OF THE DRAWINGS

FIG. 1 shows schematics of LEABS integrated in-situ, in time, and rapid compositional monitoring during three-dimensional additive manufacturing, according to preferred embodiments described herein, during (a) precursor injection additive manufacturing and (b) powder bed additive manufacturing.

FIG. 2 shows a block diagram illustrating an exemplary method for Laser Energy Assisted Breakdown Spectroscopy (LEABS) coupled rapid physics-informed peak identification algorithm (RPIPIA) to monitor the atomic composition of component material in pseudo-real time during its fabrication using high energy input (HEI) based additive manufacturing, according to preferred embodiments described herein.

DETAILED DESCRIPTION OF PREFERRED EMBODIMENTS

Figure 3:
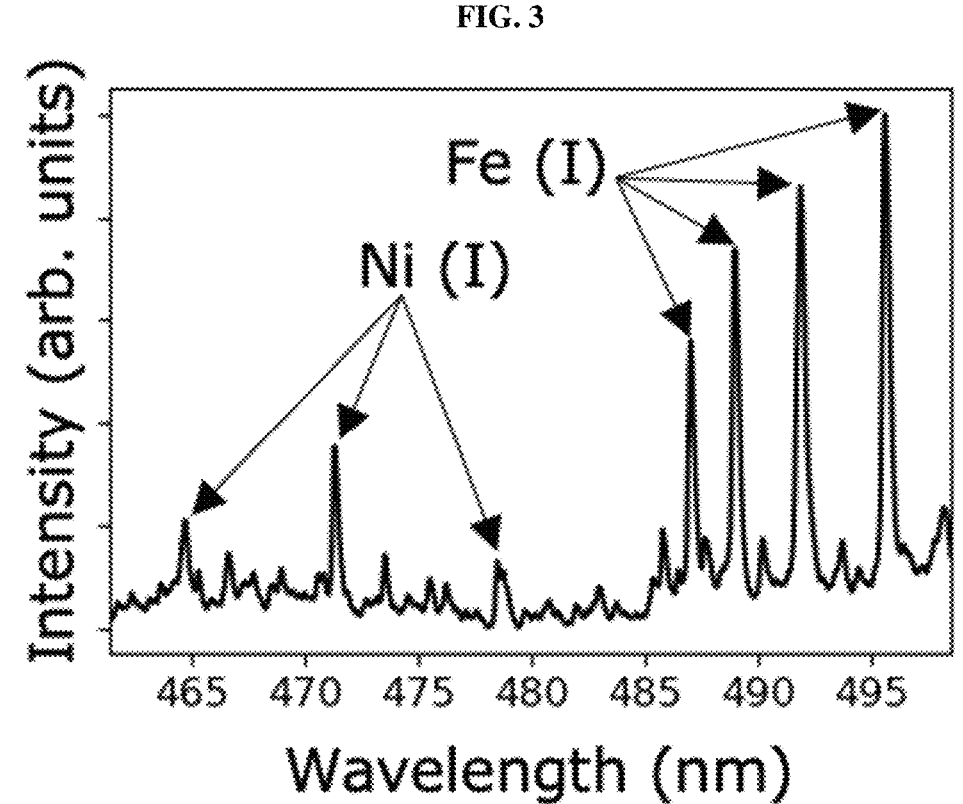
FIG. 3 shows exemplary LEABS spectra collected from a mixed composition sample (75 wt % Fe+25 wt. % Ni) for a preferred wavelength window selected for composition monitoring.

The present disclosure relates to in-situ and real time monitoring of the chemical composition of a component being fabricated by high density input three-dimensional additive manufacturing.

Preferred embodiments described herein include the use of Laser Energy Assisted Breakdown Spectroscopy (LEABS) coupled with a rapid physics-informed peak identification algorithm (RPIPIA) to monitor the atomic composition of component material (metallic, intermetallic, ceramic and metallic or ceramic matrix composites) in pseudo-real time during its fabrication using high energy density (laser, ion beam, gas plasma, electric resistance/discharge, gas torch) input (HEDI) based additive manufacturing. In preferred embodiments utilizing the LEABS technique, a gated detector is delayed with respect to the ablation event produced by a short (<10 ns) probe laser pulse. In the initial stages of plasma generation, the continuum radiation is much stronger and tends to overwhelm the atomic emission spectra of interest. By using a pulsed laser and specifically delayed time-gated spectra recording, much of this background emission is avoided altogether, radically improving signal to noise ratio and detection limits. This reveals the well-defined characteristic atomic emission lines, which can be used for quantitative elemental composition analysis. In this disclosure, a physics-based computational approach is integrated with LEABS to rapidly analyze and semi-quantify characteristic elemental emission peaks to obtain compositional information in a time scale comparable to the process scan speeds in typical AM processes, allowing for real-time composition monitoring.

In preferred embodiments, for LEABS probe analysis, a fs probe laser system capable of delivering pulses of 250-10,000 fs length with energy of 20-200 μJ per pulse and pulse repetition rates ranging from single-shot to 100 kHz is used in tandem with a spectrometer capable of 0.02-0.5 nm wavelength resolution in 100-1,500 nm range. An output of the interaction between this secondary laser energy assisted beam spectroscopy (LEABS) probe of infrared (IR) with three dimensionally AM fabricated component material is coupled to a high sensitivity intensified sCMOS detector, for which acquisition timing delay and gate resolutions is less than 2 ns. As an example, in a preferred embodiment, a 1040 nm fiber amplified femtosecond laser (Spectra Physics, Spirit HE 1040-30-SHG) with >120 μJ pulses at 250 kHz is pulse picked with an integrated acousto-optic modulator to produce a 10 kHz pulse train with 250 fs pulses.

Schematics of an exemplary operational LEABS set-up integrated with (a) precursor injection and (b) powder bed additive manufacturing setups, according to preferred embodiments described herein, is presented in FIG. 1. In the embodiments shown in FIG. 1, the LEABS laser probe beam is focused onto the surface the sample being AM processed using a 100 mm plano-convex lens resulting in a spot size of <100 μm. The plasma emission is collected with a 150 mm UV enhanced achromatic doublet and focused into a multimode fiber with an all-reflective fiber collimator. The emission is dispersed by a 1200 g/mm grating spectrometer (Andor, Kymera328i) and detected with an intensified sCMOS detector (Andor, iSTAR). The detector is synchronized to the optical pulse train and gated to measure the emission at 50 ns after the ablation event with a gate width of 10 μs. At above mentioned set of parameters, the LEABS can operate with a spatial resolution below 10 μm and vertical (depth) resolution below 1 μm. The acquisition and subsequent data analysis are automated in Python using the Xarray package for multidimensional data management. With this integrated approach the data acquisition and analysis can be performed in extremely rapid times of <30 ms and <10 ms respectively. Furthermore, depending upon the hardware latency (30-100 ms), a maximum acquisition and data processing time is in the range of 40-150 ms per detection event thereby providing an AM in-situ in time compositional measurement/analysis at the rate of 6 Hz-25 Hz.

A traditional full multi-Lorentzian peak fitting regression algorithm is commonly agreed on as the most reliable way of retrieving peak areas and plasma parameters from the spectroscopic data. However, the computational cost and associated time delay are too high to be useful in metal AM processing for in-situ compositional monitoring and real-time process corrections. For rapid qualitative and quantitative measurements which can be used with AM processing close-loop controls, atomic emission spectra of the expected elemental species are preferably first simulated by calculating the expected emissivity of each transition using data compiled by the NIST ASD database. Using this database of physical constants, a computational algorithm was developed to simulate the expected optical emission spectra from a laser-induced plasma at a given plasma temperature and atomic composition.

The emissivity of a single atomic transition can be modeled as:

$$\varepsilon_{ki}^z = \frac{hc}{\lambda_{ki}} A_{ki}^z \frac{N^z}{Q^z(T)} g_k^z e^{-\frac{E_k^z}{k_B T}}$$

where the partition function Q(T) is defined as $$Q^z(T) = \sum g_k^z e^{-\frac{E_k^z}{k_B T}}$$

In the above, the indices i and k represent the lower and upper atomic energy levels of the transition, respectively, z indexes the ionic species, and h, c, and $k_B$ are Planck's constant, the speed of light, and Boltzmann's constant, respectively. $\lambda_{ki}$ is the wavelength of the optical emission, $$A_{ki}^z$$

is the transition rate, $N^z$ is the number density of electrons in the plasma, $$g_k^z$$

is the degeneracy of the upper level, and $$E_k^z$$

is the energy of the upper level. A given transition is parameterized by only plasma temperature and electron density. All other parameters are constants that are catalogued in the NIST ASD database. In order to simulate atomic emission spectra, the NIST ASD is queried to locate the relevant parameters for each ionic species expected to be in the plasma. The partition function is calculated as a function of temperature, and the electron density and plasma temperatures are chosen to be $10^{17}$ cm$^{-3}$ and 1 eV respectively.

To limit the computational time cost in an autonomous procedure for experimental data peak identification and intensity determination, simulated peak intensities were used to identify the expected intensities of each relevant transition and such were compared to an arbitrary selected threshold as cut-off for the selection of peaks to be included in experimental spectra peak identification. This cut-off is set at 5-20% of the maximum peak intensity in expected emission lines from each spectra simulation, depending on the signal to noise ratio and the required balance between sensitivity for detecting smaller composition concentrations and the rate of the data analysis. Peaks with below cut-off intensity of the maximum observed in the simulation spectra are not considered. The smaller cut-off threshold helps detect and track smaller peak intensities. This, for example, can be helpful for monitoring AM processing of complex composition alloys in the expense of a longer time needed to identify and calculate intensities for multiple peaks. The larger cut-off threshold is useful for the AM process monitoring of more simple alloys, such as binary alloys or other simple alloys, to track main peaks and reduce data processing time for a faster composition data rate. In such way, the regulation of the cut-off threshold allows for a simple and reliable way for the optimization of the method sensitivity vs the rate of the analysis and can be easily customized for each specific AM process need. After applying the threshold cut-off for the reduction of the expected peaks for identification, the simulation peak positions are used as constraints in a peak finding algorithm applied to the experimental spectra. Such can then be used to index and analyze the experimental spectroscopic data, avoiding Lorentzian peak-fitting multi-step nonlinear regression algorithms and thus allowing pseudo-real-time composition monitoring in AM.

FIG. 2 shows a block diagram illustrating an exemplary method for Laser Energy Assisted Breakdown Spectroscopy (LEABS) coupled rapid physics-informed peak identification algorithm (RPIPIA) to monitor the atomic composition of component material in pseudo-real time during its fabrication using high energy input (HEI) based additive manufacturing, according to preferred embodiments described herein.

Accordingly, preferred embodiments described herein relate to a method for monitoring chemical composition of a component during manufacture of the component by an additive manufacturing system having a high energy density input source, wherein the high energy density input source contacts and ablates precursor materials to form the component at a fabrication point, and wherein the component is formed additively and three-dimensionally as the unprocessed precursor materials are moved to the fabrication point. Steps in preferred embodiments of the method include:

(a) traversing a laser energy assisted beam spectroscopy probe on a surface of the component at a monitoring location in proximity to and behind the fabrication point, wherein the laser energy assisted beam spectroscopy probe comprises a 1040 nm fiber amplified femtosecond laser, wherein the laser energy assisted beam spectroscopy probe is operated at a predetermined pulse energy and frequency, wherein the laser energy assisted beam spectroscopy probe is pulse picked with an integrated acousto-optic modulator to generate a fixed pulse train, and wherein the laser energy assisted beam spectroscopy probe is focused onto the surface of the component at the monitoring location using a plano-convex lens;

(b) generating plasma emission by interaction of the laser energy assisted beam spectroscopy probe with the component during manufacture of the component at the monitoring location on the surface of the component;

(c) collecting the plasma emission with an ultraviolet enhanced achromatic doublet and focusing the plasma emission into a multimode fiber with an all-reflective fiber collimator to create focused plasma emission;

(d) dispersing the focused plasma emission using a grating spectrometer to generate dispersed focused plasma emission;

(e) detecting the dispersed focused plasma emission with an intensified detector, wherein the intensified detector is synchronized with the fixed pulse train and gated to detect the dispersed focused plasma emission at a fixed duration after ablation at a suitable gate width, to generate detected plasma emission data;

(f) analyzing the detected plasma emission data using a processor programmed with a computational algorithm for predicting chemical composition of the component at the monitoring location based on the detected plasma emission data; and (g) generating a predicted chemical composition of the component at the monitoring location.

In additional preferred embodiments of the described method, steps (a)-(g) are repeated at additional monitoring locations during manufacture of the component in order to monitor the chemical composition of the component during manufacture of the component. This monitoring is in-situ and in real time.

Further preferred embodiments described herein relate to a system for monitoring chemical composition of a component during manufacture of the component by an additive manufacturing system having a high energy density input source, wherein the high energy density input source contacts and ablates precursor materials to form the component at a fabrication point, and wherein the component is formed additively and three-dimensionally as the unprocessed precursor materials are moved to the fabrication point. Preferred embodiments of the system include:

(a) a laser energy assisted beam spectroscopy probe, wherein the laser energy assisted beam spectroscopy probe comprises a 1040 nm fiber amplified femtosecond laser, wherein the laser energy assisted beam spectroscopy probe is operated at a predetermined pulse energy and frequency, wherein the laser energy assisted beam spectroscopy probe is pulse picked with an integrated acousto-optic modulator to generate a fixed pulse train, and wherein the laser energy assisted beam spectroscopy probe is focused onto a surface of the component during manufacture of the component at a monitoring location in proximity to and behind the fabrication point using a plano-convex lens;

(b) an ultraviolet enhanced achromatic doublet for collecting plasma emission generated by interaction of the laser energy assisted beam spectroscopy probe with the component during manufacture of the component at the monitoring location;

(c) an all-reflective fiber collimator for focusing the plasma emission into a multimode fiber to create focused plasma emission;

(d) a grating spectrometer for dispersing the focused plasma emission to generate dispersed focused plasma emission;

(e) an intensified detector for detecting the dispersed focused plasma emission, wherein the intensified detector is synchronized with the fixed pulse train and gated to detect the dispersed focused plasma emission at a fixed duration after ablation at a suitable gate width, to generate detected plasma emission data; and (f) a processor programmed with a computational algorithm for analyzing the detected plasma emission data and predicting chemical composition of the component during manufacture of the component at the monitoring location based on the detected plasma emission data.

In additional preferred embodiments of the method and system described above, the 1040 nm fiber amplified femtosecond laser delivers pulses of 250-10,000 fs length with energy of 20-200 µJ per pulse and pulse repetition rates ranging from single-shot to 100 kHz, and the laser energy assisted beam spectroscopy probe is capable of 0.02-0.5 nm wavelength resolution in a 100-1500 nm range. In further preferred embodiments, 1040 nm fiber amplified femtosecond laser delivers pulses of 250 fs with energy greater than 120 µJ at a pulse repetition rate of 250 kHz, and the laser energy assisted beam spectroscopy probe is pulse picked with the integrated acousto-optic modulator to produce a 10 kHz fixed pulse train.

Additional preferred embodiments of the method and system utilize a plano-convex lens that is a 100 mm plano-convex lens, such that the laser energy assisted beam spectroscopy probe focuses on the surface of the component with a spot size of less than 100 µm. In additional preferred embodiments, the ultraviolet enhanced achromatic doublet is a 150 mm ultraviolet enhanced achromatic doublet. Further preferred embodiments utilize a grating spectrometer that is a 1200 g/mm grating spectrometer. In additional preferred embodiments, the intensified detector is an intensified sCMOS detector, and the intensified sCMOS detector is synchronized with the fixed pulse train and gated to detect the dispersed focused plasma emission 50 ns after ablation of the precursor materials at a gate width of 10 µm, to generate detected plasma emission data. In preferred embodiments, the acquisition time is 100 ms at a 1 kHz laser repetition rate (100 optical pulses per measurement) and the spectrum acquisition rate is above 5 Hz. In additional preferred embodiments, the overall peak identification and peak area comparative analysis (intensity) using simulation analysis time is less than 30 ms for each collected spectrum.

Preferred embodiments of the method and system utilize a processor programmed with a computational algorithm of:

$$\varepsilon_{ki}^z = \frac{hc}{\lambda_{ki}} A_{ki}^z \frac{N^z}{Q^z(T)} g_k^z e^{-\frac{E_k^z}{k_B T}}$$

wherein partition function Q(T) is defined as:

$$Q^z(T) = \sum g_k^z e^{-\frac{E_k^z}{k_B T}}$$

wherein i and k represent lower and upper atomic energy levels of the transition, respectively, z indexes ionic species, h, c, and $k_B$ are Planck's constant, the speed of light, and Boltzmann's constant, respectively, $\lambda_{ki}$ is wavelength of optical emission, $$A_{ki}^z$$

is transition rate, $N^z$ is number density of electrons in the plasma emission, $$g_k^z$$

is degeneracy of an upper level, and $$E_k^z$$

is energy of the upper level.

The preferred computational algorithm noted above that may be used by the processor is calculated based on an electron density of $10^{17}$ cm$^{-3}$ and plasma temperature of 1 eV.

EXAMPLES

FIG. 3 shows LEABS spectra collected from additively manufactured compositionally graded 75 wt % Fe+25 wt. % Ni binary alloy sample surface. The peaks shown in the spectral region from about 460 nm to 500 nm are well separated and considered after comparing the spectra from 100% Fe and 100% Ni and are indexed to existing emission databases. For quantitatively unknown compositions, the modeling approach described above can be adopted for rapid in time identification and intensity prediction of peaks.

Figure 4:
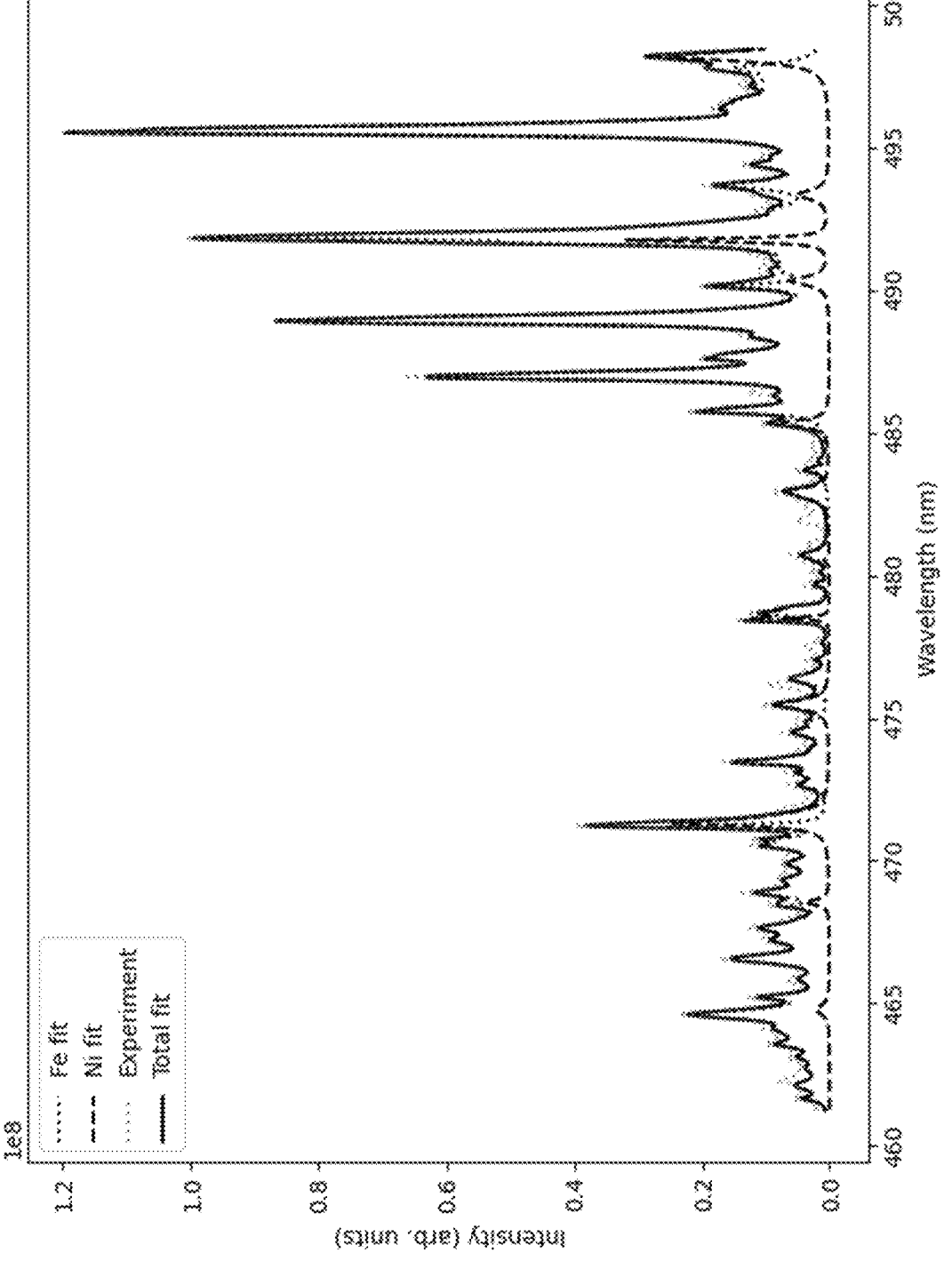
FIG. 4 shows a comparison of experimentally observed and simulation-based expected spectra for Fe and Ni in 75 wt. % Fe+25 wt. % Ni alloy sample.

To limit the computational time and cost in an autonomous procedure for experimental data peak identification and fitting, the simulated peak positions and intensities are used to identify the expected intensities of each relevant transition and compare such to a selected cut-off threshold as described above for the selection of how many low-intensity peaks will be included in experimental spectra peak fitting, and thus tune the method sensitivity and computational time for the needed balance in specific AM processing based on the alloy composition complexity. After such reduction, the simulation algorithms automatically retrieve corresponding emission peak parameters (i, k, $E_i$, $E_k$, $g_i$, $g_k$, and A) from NIST ASD and then apply these as peak fitting inputs for the equations provided above for spectra computational modeling, thereby enabling the rapid simulation of the individual peak wavelengths (positions) and intensities. The simulated peak positions and intensities are used as constraints in a peak-finding algorithm applied to the experimental spectra for identification and tagging of intensity measurements. The overall peak modeling identification and intensity measurement time is less than 30 ms for each collected spectrum. The acquisition time is 100 ms at a 1 kHz laser repetition rate (100 optical pulses per measurement). Therefore, the spectrum acquisition rate is conservatively above 5 Hz, accounting for an additional latency due to acquisition electronics. Such peak identification and peak area comparative analysis, using a peak simulation algorithm written in Python to identify each peak in the experimental data related to additively manufactured 75 wt % Fe+25 wt. % Ni (FIG. 3) is presented in FIG. 4.

Figure 5:
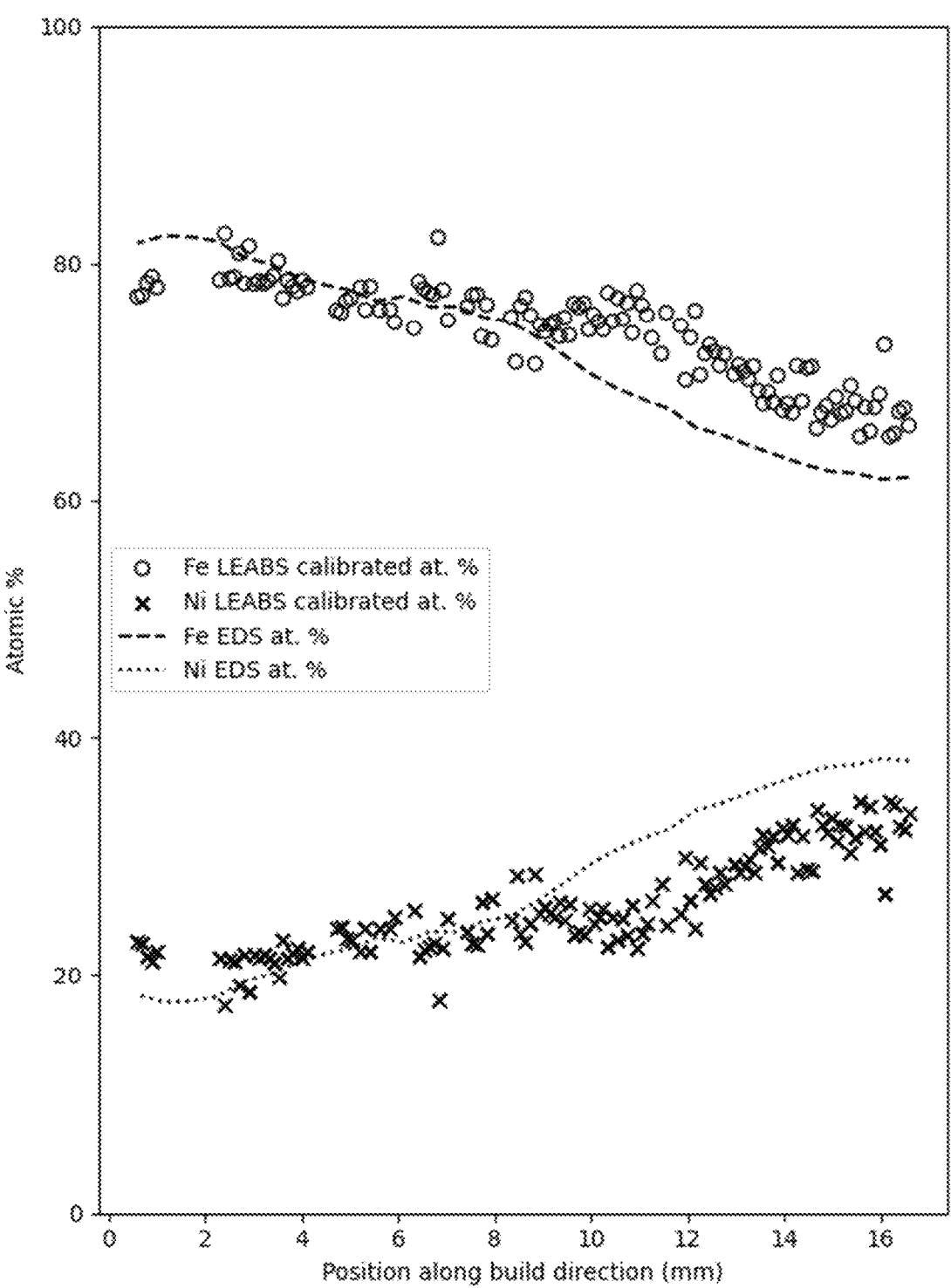
FIG. 5 shows a comparison of energy dispersive spectroscopy (EDS) measured atomic percent (at. %) elemental composition in Fe—Ni gradient alloy samples along the main AM build axis with compositions measured in the same sample from the ratio of Fe and Ni peak intensities in LEABS emission spectra using calibrated experimental spectroscopic peak intensity data obtained via energy dispersive x-ray spectroscopy (EDS) technique.

Furthermore, the validity and accuracy of the LEABS-based in-time rapid compositional analysis technique described in this disclosure in comparison with the composition mapped in an ex-situ manner using conventional scanning electron microscopy (SEM) based EDS analysis of laser direct energy deposition-based AM fabricated graded Fe—Ni samples in the build direction is presented in FIG. 5. It presents the validity of the LEABS approach for the compositional analysis, as both data trace very closely in terms of a general trend in variation of composition (at. %) and nature of the variation as a function of the position along the AM build direction.

What is claimed is:

1. A method for monitoring chemical composition of a component during manufacture of the component by an additive manufacturing system having a high energy density input source, wherein the high energy density input source contacts and ablates precursor materials to form the component at a fabrication point, and wherein the component is formed additively and three-dimensionally as the unprocessed precursor materials are moved to the fabrication point, comprising:

(a) traversing a laser energy assisted beam spectroscopy probe on a surface of the component at a monitoring location in proximity to and behind the fabrication point, wherein the laser energy assisted beam spectroscopy probe comprises a 1040 nm fiber amplified femtosecond laser, wherein the laser energy assisted beam spectroscopy probe is operated at a predetermined pulse energy and frequency, wherein the laser energy assisted beam spectroscopy probe is pulse picked with an integrated acousto-optic modulator to generate a fixed pulse train, and wherein the laser energy assisted beam spectroscopy probe is focused onto the surface of the component at the monitoring location using a plano-convex lens;

(b) generating plasma emission by interaction of the laser energy assisted beam spectroscopy probe with the component during manufacture of the component at the monitoring location on the surface of the component;

(c) collecting the plasma emission with an ultraviolet enhanced achromatic doublet and focusing the plasma emission into a multimode fiber with an all-reflective fiber collimator to create focused plasma emission;

(d) dispersing the focused plasma emission using a grating spectrometer to generate dispersed focused plasma emission;

(e) detecting the dispersed focused plasma emission with an intensified detector, wherein the intensified detector is synchronized with the fixed pulse train and gated to detect the dispersed focused plasma emission at a fixed duration after ablation at a suitable gate width, to generate detected plasma emission data;

(f) analyzing the detected plasma emission data using a processor programmed with a computational algorithm for predicting chemical composition of the component at the monitoring location based on the detected plasma emission data; and (g) generating a predicted chemical composition of the component at the monitoring location.

2. The method of claim 1, further comprising repeating steps (a)-(g) at additional monitoring locations during manufacture of the component in order to monitor the chemical composition of the component during manufacture of the component.

3. The method of claim 1, wherein the 1040 nm fiber amplified femtosecond laser delivers pulses of 250-10,000 fs length with energy of 20-200 µJ per pulse and pulse repetition rates ranging from single-shot to 100 kHz, and wherein the laser energy assisted beam spectroscopy probe is capable of 0.02-0.5 nm wavelength resolution in a 100-1500 nm range.

4. The method of claim 1, wherein the 1040 nm fiber amplified femtosecond laser delivers pulses of 250 fs with energy greater than 120 µJ at a pulse repetition rate of 250 kHz, and wherein the laser energy assisted beam spectroscopy probe is pulse picked with the integrated acousto-optic modulator to produce a 10 kHz fixed pulse train.

5. The method of claim 1, wherein the plano-convex lens is a 100 mm plano-convex lens and the laser energy assisted beam spectroscopy probe focuses on the surface of the component with a spot size of less than 100 µm.

6. The method of claim 1, wherein the ultraviolet enhanced achromatic doublet is a 150 mm ultraviolet enhanced achromatic doublet.

7. The method of claim 1, wherein the grating spectrometer is a 1200 g/mm grating spectrometer.

8. The method of claim 1, wherein the intensified detector is an intensified sCMOS detector, and wherein the intensified sCMOS detector is synchronized with the fixed pulse train and gated to detect the dispersed focused plasma emission 50 ns after ablation at a gate width of 10 µm, to generate detected plasma emission data.

9. The method of claim 1, wherein the computational algorithm is:

$$\varepsilon_{ki}^{z} = \frac{hc}{\lambda_h} A_{ki}^{Z} \frac{N^{Z}}{Q^{Z}(T)} g_{k}^{z} e^{\frac{E_{k}^{Z}}{k_{B}T}}$$

wherein partition function Q(T) is defined as:

$$Q^{z}(T) = \sum g_{k}^{z} e^{-\frac{E_{k}^{z}}{k_{B}T}}$$

wherein i and k represent lower and upper atomic energy levels of the transition, respectively, z indexes ionic species, h, c, and $k_B$ are Planck's constant, the speed of light, and Boltzmann's constant, respectively, $\lambda_{ki}$ is wavelength of optical emission, $$A_{ki}^{z}$$

is transition rate, $N^z$ is number density of electrons in the plasma emission, $$g_k^z$$

is degeneracy of an upper level, and $$E_k^z$$

is energy of the upper level.

10. The method of claim 9, wherein the computational algorithm is calculated based on an electron density of $10^{17}$ cm$^{-3}$ and plasma temperature of 1 eV.

11. A system for monitoring chemical composition of a component during manufacture of the component by an additive manufacturing system having a high energy density input source, wherein the high energy density input source contacts and ablates precursor materials to form the component at a fabrication point, and wherein the component is formed additively and three-dimensionally as the unprocessed precursor materials are moved to the fabrication point, comprising:

(a) a laser energy assisted beam spectroscopy probe, wherein the laser energy assisted beam spectroscopy probe comprises a 1040 nm fiber amplified femtosecond laser, wherein the laser energy assisted beam spectroscopy probe is operated at a predetermined pulse energy and frequency, wherein the laser energy assisted beam spectroscopy probe is pulse picked with an integrated acousto-optic modulator to generate a fixed pulse train, and wherein the laser energy assisted beam spectroscopy probe is focused onto a surface of the component during manufacture of the component at a monitoring location in proximity to and behind the fabrication point using a plano-convex lens;

(b) an ultraviolet enhanced achromatic doublet for collecting plasma emission generated by interaction of the laser energy assisted beam spectroscopy probe with the component during manufacture of the component at the monitoring location;

(c) an all-reflective fiber collimator for focusing the plasma emission into a multimode fiber to create focused plasma emission;

(d) a grating spectrometer for dispersing the focused plasma emission to generate dispersed focused plasma emission;

(e) an intensified detector for detecting the dispersed focused plasma emission, wherein the intensified detector is synchronized with the fixed pulse train and gated to detect the dispersed focused plasma emission at a fixed duration after ablation at a suitable gate width, to generate detected plasma emission data; and (f) a processor programmed with a computational algorithm for analyzing the detected plasma emission data and predicting chemical composition of the component during manufacture of the component at the monitoring location based on the detected plasma emission data.

12. The system of claim 11, wherein the 1040 nm amplified femtosecond laser delivers pulses of 250-10,000 fs length with energy of 20-200 μJ per pulse and pulse repetition rates ranging from single-shot to 100 kHz, and wherein the laser energy assisted beam spectroscopy probe is capable of 0.02-0.5 nm wavelength resolution in a 100-1500 nm range.

13. The system of claim 11, wherein the 1040 nm fiber amplified femtosecond laser delivers pulses of 250 fs with energy greater than 120 μJ at a pulse repetition rate of 250 kHz, and wherein the laser energy assisted beam spectroscopy probe is pulse picked with the integrated acousto-optic modulator to produce a 10 kHz fixed pulse train.

14. The system of claim 11, wherein the plano-convex lens is a 100 mm plano-convex lens and the laser energy assisted beam spectroscopy probe focuses on the surface of the component with a spot size of less than 100 μm.

15. The system of claim 11, wherein the ultraviolet enhanced achromatic doublet is a 150 mm ultraviolet enhanced achromatic doublet.

16. The system of claim 11, wherein the grating spectrometer is a 1200 g/mm grating spectrometer.

17. The system of claim 11, wherein the intensified detector is an intensified sCMOS detector, and wherein the intensified sCMOS detector is synchronized with the fixed pulse train and gated to detect the dispersed focused plasma emission 50 ns after ablation of the precursor materials at a gate width of 10 μm, to generate detected plasma emission data.

18. The system of claim 11, wherein the computational algorithm is:

$$\varepsilon_{ki}^z = \frac{hc}{\lambda_{ki}} A_{ki}^Z \frac{N^z}{Q^z(T)} g_k^z e^{-\frac{E_k^z}{k_B T}}$$

wherein partition function Q(T) is defined as:

$$Q^z(T) = \sum g_k^z e^{-\frac{E_k^z}{k_B T}}$$

wherein i and k represent lower and upper atomic energy levels of the transition, respectively, z indexes ionic species, h, c, and $k_B$ are Planck's constant, the speed of light, and Boltzmann's constant, respectively, $\lambda_{ki}$ is wavelength of optical emission, $$A_{ki}^z$$

is transition rate, $N^z$ is number density of electrons in the plasma emission, $$g_k^z$$

is degeneracy of an upper level, and $$E_k^z$$

is energy of the upper level.

19. The system of claim 18, wherein the computational algorithm is calculated based on an electron density of $10^{17}$ cm$^{-3}$ and plasma temperature of 1 eV.

\* \* \* \* \*